US012426122B2

(12) United States Patent
Xu

(10) Patent No.: US 12,426,122 B2
(45) Date of Patent: Sep. 23, 2025

(54) RESOURCE DETERMINATION METHOD AND APPARATUS, RESOURCE CONFIGURATION METHOD AND APPARATUS, COMMUNICATION NODE, AND STORAGE MEDIUM

(71) Applicant: ZTE CORPORATION, Guangdong (CN)

(72) Inventor: Jing Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 332 days.

(21) Appl. No.: 18/024,866

(22) PCT Filed: Sep. 2, 2021

(86) PCT No.: PCT/CN2021/116154
§ 371 (c)(1),
(2) Date: Mar. 6, 2023

(87) PCT Pub. No.: WO2022/048583
PCT Pub. Date: Mar. 10, 2022

(65) Prior Publication Data
US 2023/0319940 A1  Oct. 5, 2023

(30) Foreign Application Priority Data
Sep. 7, 2020 (CN) .......................... 202010930052.4

(51) Int. Cl.
*H04W 76/20* (2018.01)
*H04W 72/11* (2023.01)
*H04W 72/23* (2023.01)

(52) U.S. Cl.
CPC ............ *H04W 76/20* (2018.02); *H04W 72/11* (2023.01); *H04W 72/23* (2023.01)

(58) Field of Classification Search
CPC ..... H04W 76/20; H04W 72/11; H04W 72/23; H04W 72/0453
See application file for complete search history.

(56) References Cited

U.S. PATENT DOCUMENTS

2010/0113058 A1  5/2010  Wu
2017/0143704 A1*  5/2017  Thatte .................... A61K 45/06
(Continued)

FOREIGN PATENT DOCUMENTS

CN    102104982       6/2011
CN    111065165 A     4/2020
(Continued)

OTHER PUBLICATIONS

European Communication under Rule 71(3) EPC issued in EP Patent Application No. 21863647.0, dated Feb. 21, 2025, 39 pages.
(Continued)

*Primary Examiner* — Andrew Lee
(74) *Attorney, Agent, or Firm* — Perkins Coie LLP

(57) ABSTRACT

Provided are a resource determination method and apparatus, a resource configuration method and apparatus, a communication node and a storage medium. In the resource determination method, a radio resource control (RRC) reconfiguration message is received, where the RRC reconfiguration message includes dedicated carrier configuration information; and a target semi-persistent scheduling (SPS) resource in a carrier indicated by the dedicated carrier configuration information is determined according to relevant resource configuration information.

6 Claims, 5 Drawing Sheets

Receive a radio resource control (RRC) reconfiguration message, where the RRC reconfiguration message includes dedicated carrier configuration information — 110

Determine a target semi-persistent scheduling (SPS) resource in the carrier indicated by the dedicated carrier configuration information according to relevant resource configuration information — 120

(56) References Cited

U.S. PATENT DOCUMENTS

| | | | |
|---|---|---|---|
| 2018/0042016 A1 | 2/2018 | Babaei et al. | |
| 2018/0097584 A1* | 4/2018 | Park | H04L 1/1812 |
| 2018/0332430 A1* | 11/2018 | Kumar | H04W 4/02 |
| 2018/0332606 A1 | 11/2018 | Lee et al. | |
| 2020/0163103 A1 | 5/2020 | Kuang et al. | |
| 2020/0178344 A1 | 6/2020 | Shan et al. | |
| 2020/0274750 A1* | 8/2020 | Yi | H04J 11/0076 |
| 2021/0266945 A1* | 8/2021 | Ma | H04W 72/535 |
| 2023/0074086 A1* | 3/2023 | Yi | H04L 1/1822 |
| 2023/0189295 A1* | 6/2023 | Baek | H04W 76/40 370/312 |
| 2023/0232189 A1* | 7/2023 | Kim | H04W 4/06 370/312 |
| 2023/0299890 A1* | 9/2023 | Baek | H04W 72/30 370/329 |

FOREIGN PATENT DOCUMENTS

| | | |
|---|---|---|
| CN | 111555839 | 8/2020 |
| CN | 112055360 | 12/2020 |
| EP | 3478019 A1 | 5/2019 |
| EP | 3498008 A1 | 6/2019 |
| WO | 2018024943 | 2/2018 |
| WO | 2018031816 A1 | 2/2018 |
| WO | 2018201679 A1 | 11/2018 |

OTHER PUBLICATIONS

Chinese Notification to Complete Formalities of Registration issued in CN Patent Application No. 202010930052.4, dated Jul. 18, 2024, 4 pages. English translation included.
European Search Report issued in EP Patent Application No. 21863647.0, dated Aug. 2, 2024, 9 pages.
Huawei et al., "Remaining issues for AUL resource allocation," 3GPP TSG RAN WG1 Meeting #91, R1-1719498, Reno, USA, Nov. 27-Dec. 1, 2017, 4 pages.
Huawei, "Summary of [99bis#41] [NR UP/MAC] Open issues on SPS and GF—Huawei," 3GPP TSG RAN WG2 Meeting 100, R2-1713173, Reno, United States, Nov. 27-Dec. 1, 2017, 59 pages.
European Communication pursuant to Article 94(3) EPC issued in EP Patent Application No. 21863647.0, dated Sep. 25, 2024, 6 pages.
European Communication pursuant to Article 94(3) EPC issued in EP Patent Application No. 21863647.0, dated Dec. 2, 2024, 5 pages.
Chinese office action issued in CN Patent Application No. 202010930052.4, dated Jan. 1, 2024, 12 pages. English translation included.
Ericsson, "Discarding configured grants and assignments when receiving RRC reconfiguration of SPS-Config," 3GPP TSG-RAN WG2 #103, Tdoc R2-1811144, Resubmission of R2-1808159, Goteborg, Sweden, Aug. 20-24, 2018, 4 pages.
International Search Report and Written Opinion issued in International Patent Application No. PCT/CN2021/116154, dated Oct. 28, 2021, 14 pages. English translation included.
International Preliminary Report on Patentability issued in International Patent Application No. PCT/CN2021/116154, dated Mar. 7, 2023, 5 pages.
Ericsson, "Physical layer scheduling request for NB-IoT," 3GPP TSG-RAN WG1 Meeting #93, R1-1805858, 2018.
Patent Cooperation Treaty (PCT), International Search Report and Written Opinion for Application PCT/US2021/0116154 filed on Sep. 2, 2021, mailed Oct. 28, 2021, International Searching Authority, CN.
Chinese office action issued in CN Patent Application No. 202010930052.4, dated Apr. 18, 2024, 13 pages. English translation included.
Indian Examination Report issued in IN Patent Application No. 202327022634, dated Jan. 3, 2025, 8 pages.

* cited by examiner

RESOURCE DETERMINATION METHOD AND APPARATUS, RESOURCE CONFIGURATION METHOD AND APPARATUS, COMMUNICATION NODE, AND STORAGE MEDIUM

CROSS-REFERENCE TO RELATED APPLICATIONS

This application is a national stage application filed under 35 U.S.C. 371 based on International Patent Application No. PCT/CN2021/116154, filed on Sep. 2, 2021, which claims priority to Chinese Patent Application No. 202010930052.4 filed with the CNIPA on Sep. 7, 2020, disclosures of which are incorporated herein by reference in their entireties.

TECHNICAL FIELD

The present application relates to the field of radio communication networks, for example, a resource determination method and apparatus, a resource configuration method and apparatus, a communication node and a storage medium.

BACKGROUND

Semi-persistent scheduling (SPS) in the Internet of Things (IoT) communication technology may be used for transmitting to-be-transmitted uplink data of the terminal, and the volume of the to-be-transmitted uplink data is indicated by a buffer status report (BSR). The network side configures the turning-on of the SPS function through radio resource control (RRC) dedicated signaling, and activates and allocates SPS resources through downlink control information (DCI). If receiving an RRC connection release message, the terminal terminates the SPS function and deletes relevant configuration of the SPS resources. The Internet of Things communication technology supports multiple carriers, and the SPS resources of the terminal are physical resources on a dedicated carrier configured by the network side. In a case where the network side switches the terminal to another dedicated carrier, the previously configured SPS resources cannot be directly used for transmitting data, which may result in the termination of the SPS function and the unsuccessful transmission of the BSR, thus affecting the communication quality.

SUMMARY

The present application provides a resource determination method and apparatus, a resource configuration method and apparatus, a communication node and a storage medium, so as to improve the flexibility and reliability of SPS resource transmission in the carrier switching scene.

An embodiment of the present application provides a resource determination method. The method includes steps described below.

A radio resource control (RRC) reconfiguration message is received, where the RRC reconfiguration message includes dedicated carrier configuration information; and a target semi-persistent scheduling (SPS) resource in a carrier indicated by the dedicated carrier configuration information is determined according to relevant resource configuration information.

An embodiment of the present application further provides a resource configuration method. The method includes steps described below.

An RRC reconfiguration message is sent, where the RRC reconfiguration message includes dedicated carrier configuration information; and a target SPS resource in a carrier indicated by the dedicated carrier configuration information is configured according to relevant resource configuration information.

An embodiment of the present application further provides a resource determination apparatus. The apparatus includes a reception module and a resource determination module.

The reception module is configured to receive an RRC reconfiguration message, where the RRC reconfiguration message includes dedicated carrier configuration information; and the resource determination module is configured to determine a target SPS resource in a carrier indicated by the dedicated carrier configuration information according to relevant resource configuration information.

An embodiment of the present application further provides a resource configuration apparatus. The apparatus includes a sending module and a resource configuration module.

The sending module is configured to send an RRC reconfiguration message, where the RRC reconfiguration message includes dedicated carrier configuration information; and the resource configuration module is configured to configure a target SPS resource in a carrier indicated by the dedicated carrier configuration information according to relevant resource configuration information.

An embodiment of the present application further provides a communication node.

The communication node includes one or more processors and a storage apparatus configured to store one or more programs. The one or more programs, when executed by the one or more processors, cause the one or more processors to implement the preceding resource determination method or the preceding resource configuration method.

An embodiment of the present application further provides a computer-readable storage medium storing a computer program which, when executed by a processor, implements the preceding resource determination method or the preceding resource configuration method.

DETAILED DESCRIPTION

The present application is described hereinafter in conjunction with drawings and embodiments.

In the Internet of Things (IoT) system, such as the Narrowband Internet of Things (NB-IoT), the semi-persistent scheduling (SPS) function is introduced, that is, a BSR, also referred to as a buffer status report medium access control control element (BSR MAC CE), is transmitted through SPS resources. The network side may configure the turning-on of the SPS function through radio resource control (RRC) dedicated signaling, and activate and allocate the SPS resources through downlink control information (DCI); the network side may also deactivate the SPS through DCI, that is, turn off the SPS function, and in this case, the terminal stops using the SPS resources, and does not use the SPS resources until the SPS function is turned on again.

The NB-IoT supports multiple carriers, and the SPS resources of the terminal refer to physical resources on a dedicated carrier configured on the network side. In a case where carrier switching occurs, that is, the network side reconfigures the terminal to another dedicated carrier, the terminal and the network side cannot directly use the previously configured SPS resources for transmitting data, which may result in the termination of the SPS function and the unsuccessful transmission of the BSR, thus affecting the communication quality.

In the embodiment of the present application, a resource determination method is provided. In the method, in a case where the terminal is reconfigured to an indicated carrier through an RRC reconfiguration message, a target SPS resource used in the indicated carrier can be re-determined according to relevant resource configuration information, so that the flexibility and reliability of SPS resource transmission in the carrier switching scene can be improved.

Figure 1:
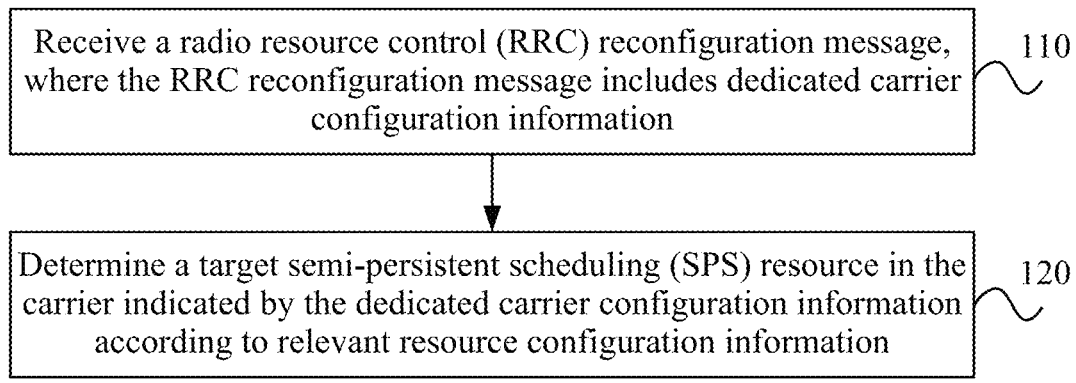
FIG. 1 is a flowchart of a resource determination method according to an embodiment.

FIG. 1 is a flowchart of a resource determination method according to an embodiment. The resource determination method of the embodiment is applicable to a communication node, and the communication node may be a user equipment (UE). As shown in FIG. 1, the method provided in the embodiment includes the following.

In 110, a radio resource control (RRC) reconfiguration message is received, where the RRC reconfiguration message includes dedicated carrier configuration information.

In the embodiment, the RRC reconfiguration message (that is, an RRC connection reconfiguration message) includes the dedicated carrier configuration information used for instructing the terminal to switch from an original carrier to an indicated carrier. Before 110, the terminal operates on the original carrier (the original carrier is different from the carrier indicated by the dedicated carrier configuration information) and knows the SPS resource used in the original carrier (described as an existing SPS resource in embodiments described below).

In 120, a target semi-persistent scheduling (SPS) resource in the carrier indicated by the dedicated carrier configuration information is determined according to relevant resource configuration information.

In the embodiment, the target SPS resource is determined according to the relevant resource configuration information. The relevant resource configuration information includes: a carrier where the target SPS resource is located, that is, the carrier indicated by the dedicated carrier configuration information; a subcarrier where the target SPS resource is located, which may be at the same position as the subcarrier of the terminal in the original carrier, or may be re-indicated by the RRC reconfiguration message; a time domain position of the target SPS resource, which mainly refers to a time domain starting position of an SPS narrowband physical uplink shared channel (NPUSCH), may be the same as a time domain starting position of the terminal in the original carrier, or may be re-indicated by the RRC reconfiguration message; a repetition period of an NPUSCH of the target SPS resource, which may be the same as a repetition period of an NPUSCH of the terminal in the original carrier, or may be re-indicated by the RRC reconfiguration message; and the number of repetitions of the NPUSCH of the target SPS resource, which may be the same as the number of repetitions of the NPUSCH of the terminal in the original carrier, or may be re-indicated by the RRC reconfiguration message.

In addition, in the carrier switching scene, the terminal may turn on the SPS function again and activate the target SPS resource by re-receiving activation DCI; or may turn on the SPS function and activate the target SPS resource upon receiving the RRC reconfiguration message without waiting for the activation DCI.

In an embodiment, an RRC layer of the terminal receives the RRC reconfiguration message, where the RRC reconfiguration message includes dedicated physical configuration (Physical Config Dedicated) information, and the dedicated physical configuration information includes the dedicated carrier configuration (Carrier Config Dedicated) information; and before receiving the RRC reconfiguration message, the terminal knows the activated existing SPS resource in the original carrier.

The resource determination method of the embodiment provides the terminal with a solution for re-determining the target SPS resource in a case where the network side reconfigures the dedicated carrier of the terminal through the RRC reconfiguration message, and the network side may also determine the target SPS resource according to the relevant resource configuration information, so that the SPS function in the carrier switching scene is achieved, and the flexibility and reliability of SPS resource transmission in the carrier switching scene are improved.

In an embodiment, 100 is further included.

In 100, the existing SPS resource is determined according to first activation DCI, a first SPS cell radio network temporary identifier (C-RNTI) and a first SPS period.

In the embodiment, before receiving the RRC reconfiguration message, the terminal has received relevant configuration, including the first SPS C-RNTI and the first SPS period, of the SPS function through an RRC message; then the terminal determines the existing SPS resource in the original carrier used for transmitting a BSR according to the first SPS C-RNTI and the first SPS period and under the indication of the first activation DCI.

In an embodiment, the relevant resource configuration information includes a first SPS C-RNTI and a first SPS period, and 120 includes the following. In a case where second activation DCI is received, the target SPS resource is determined according to the relevant resource configuration information.

In the embodiment, the terminal turns on the SPS function and activates the target SPS resource by re-receiving the activation DCI, That is, in a case where the terminal is reconfigured to the carrier indicated by the dedicated carrier configuration information, the terminal stops using the existing SPS resource in the original carrier; in a case of receiving the second activation DCI, the terminal activates the SPS function again, and may determine the target SPS resource in the carrier indicated by the dedicated carrier configuration information by using the first SPS C-RNTI and the first SPS period. In this case, the RRC reconfiguration message does not include relevant configuration related to the target SPS resource, and the target SPS resource may be determined with reference to the position of the existing SPS resource in the original carrier. For example, the subcarrier where the target SPS resource is located is at the same position as the subcarrier of the terminal in the original carrier; the time domain starting position of the target SPS resource is the same as the time domain starting position of the terminal in the original carrier; the repetition period of the NPUSCH of the target SPS resource is the same as the repetition period of the NPUSCH of the terminal in the original carrier, that is, the first SPS period; and the number of repetitions of the NPUSCH of the target SPS resource is the same as the number of repetitions of the NPUSCH of the terminal in the original carrier.

In an embodiment, 1101 is further included.

In 1101, an existing SPS resource is released according to the RRC reconfiguration message.

In the embodiment, in a case of receiving the RRC reconfiguration message, the terminal releases the existing SPS resource to complete the deactivation of the SPS function. The RRC layer of the terminal instructs a bottom layer to execute the deactivation of the SPS function, so that the existing SPS resource is no longer used to send the BSR; after the second activation DCI is received, the SPS function is activated again.

In this case, the network side does not need to resend the DCI for the deactivation, so that the signaling overhead is saved and the communication efficiency is improved.

In an embodiment, the relevant resource configuration information includes first activation DCI, a first SPS C-RNTI and a first SPS period, and 120 includes the following.

In a case where the RRC reconfiguration message is received, the target SPS resource is determined according to the relevant resource configuration information.

In the embodiment, the terminal does not need to re-receive the activation DCI, that is, in a case where the terminal receives the RRC reconfiguration message, the terminal stops using the existing SPS resource in the original carrier, and on the basis that the first activation DCI has activated the SPS function, determines the target SPS resource in the carrier indicated by the dedicated carrier configuration information according to the first SPS C-RNTI and the first SPS period. In this case, the RRC reconfiguration message does not include the configuration related to the target SPS resource. The target SPS resource may be determined by referring to the position of the existing SPS resource in the original carrier. The terminal and the network side do not need to deactivate the SPS function, and may continue to determine the target SPS resource in a new carrier according to the existing SPS resource. For example, the subcarrier where the target SPS resource is located is at the same position as the subcarrier of the terminal in the original carrier; the time domain starting position of the target SPS resource is the same as the time domain starting position of the terminal in the original carrier; the repetition period of the NPUSCH of the target SPS resource is the same as the repetition period of the NPUSCH of the terminal in the original carrier, that is, the first SPS period; and the number of repetitions of the NPUSCH of the target SPS resource is the same as the number of repetitions of the NPUSCH of the terminal in the original carrier.

In the embodiment, the target SPS resource is determined according to the latest first SPS period saved and the subcarrier, the time domain starting position and the number of repetitions indicated in the latest first activation DCI before the RRC reconfiguration message is received. That is, the target SPS resource satisfies that: the carrier where the target SPS resource is located is the carrier indicated by the dedicated carrier configuration information; the subcarrier where the target SPS resource is located is at a position which is the same as the position of the subcarrier, which is indicated by the first activation DCI, of the terminal in the original carrier; the repetition period of the NPUSCH of the target SPS resource is the same as the repetition period, which is indicated by the first activation DCI, of the NPUSCH of the terminal in the original carrier, that is, the first SPS period; the number of repetitions of the NPUSCH of the target SPS resource is the same as the number of repetitions, which is indicated by the first activation DCI, of the NPUSCH of the terminal in the original carrier; and the time domain starting position of the target SPS resource is the same as the time domain starting position of the terminal in the original carrier.

The time domain starting position of the target SPS resource satisfies that:

$$(10*SFN + \text{subframe}) = [(10*SFN_{start\ time} + \text{subframe}_{start\ time}) + N*semiPersistSchedIntervalUL] \bmod 10240,$$

where SFN and subframe represent a radio frame number and a subframe number of the starting position of the SPS NPUSCH; $SFN_{start\ time}$ and $\text{subframe}_{start\ time}$ represent a radio frame number and a subframe number of the starting position of the NPUSCH allocated in the first activation DCI; and semiPersistSchedIntervalUL represents the first SPS period.

In an embodiment, the RRC reconfiguration message further includes at least one of: subcarrier information, a time domain starting position, a second SPS C-RNTI, the number of repetitions or a second SPS period, and the relevant resource configuration information includes the RRC reconfiguration message. 120 includes the following.

In a case where the RRC reconfiguration message is received, the target SPS resource is determined according to the relevant resource configuration information.

In the embodiment, a cell is newly added to the RRC reconfiguration message to indicate information of the SPS physical resource after the RRC reconfiguration. The terminal does not need to re-receive the activation DCI; and in the case of receiving the RRC reconfiguration message, the terminal stops using the existing SPS resource in the original carrier, and determines the target SPS resource according to the second SPS period, the subcarrier, the time domain starting position and/or the number of repetitions indicated in the RRC reconfiguration message. In this case, the RRC reconfiguration message includes the configuration related to the target SPS resource, and the terminal and the network side do not need to deactivate the SPS function. In addition, the relevant configuration not indicated in the RRC reconfiguration message may be determined by referring to the position in the original carrier before the RRC reconfiguration message is received.

Exemplarily, the RRC reconfiguration message is used for indicating: the carrier where the target SPS resource is located, that is, the carrier indicated by the dedicated carrier configuration information; the subcarrier where the target SPS resource is located; the repetition period of the NPUSCH of the target SPS resource, that is, the second SPS period; the number of repetitions of the NPUSCH of the target SPS resource; and the time domain starting position of the target SPS resource, the indication form of which may be a radio frame number and a subframe number, or may be a time interval between the time domain starting position of the target SPS resource and an ending subframe of a narrowband physical downlink shared channel (NPDSCH) of the RRC reconfiguration message.

The time domain starting position of the target SPS resource satisfies that:

$$(10*SFN+\text{subframe}) = [(10*SFN_{start\ time} + \text{subframe}_{start\ time}) + N*semiPersistSchedIntervalUL]\ modulo\ 10240,$$

where SFN and subframe represent the radio frame number and the subframe number of the starting position of the SPS NPUSCH; $SFN_{start\ time}$ and $\text{subframe}_{start\ time}$ represent a radio frame number and a subframe number of the starting position of the NPUSCH indicated by the RRC reconfiguration message; and semiPersistSchedIntervalUL represents the second SPS period.

In an embodiment, 130 is further included.

In 130, after a set time interval of an ending subframe of an NPUSCH on which an RRC connection reconfiguration complete message is sent, the volume BSR of to-be-transmitted uplink data is sent through the target SPS resource.

In the embodiment, in a case where it is not required to re-receive the activation DCI, the taking-effect time of the relevant configuration of the target SPS resource is after the terminal sending the RRC connection reconfiguration complete message, for example, may be after the set time interval of the ending subframe of the NPUSCH carrying the RRC connection reconfiguration complete message. Only after the relevant configuration of the target SPS resource takes effect, the complete target SPS resource is the SPS resource available for sending the BSR, and between the time when the terminal receives the RRC reconfiguration message and the taking-effect time, the terminal and the network side do not use the existing SPS resource or the target SPS resource to transmit a BSR MAC CE.

The process of determining the target SPS resource is described below through examples.

Figure 2:
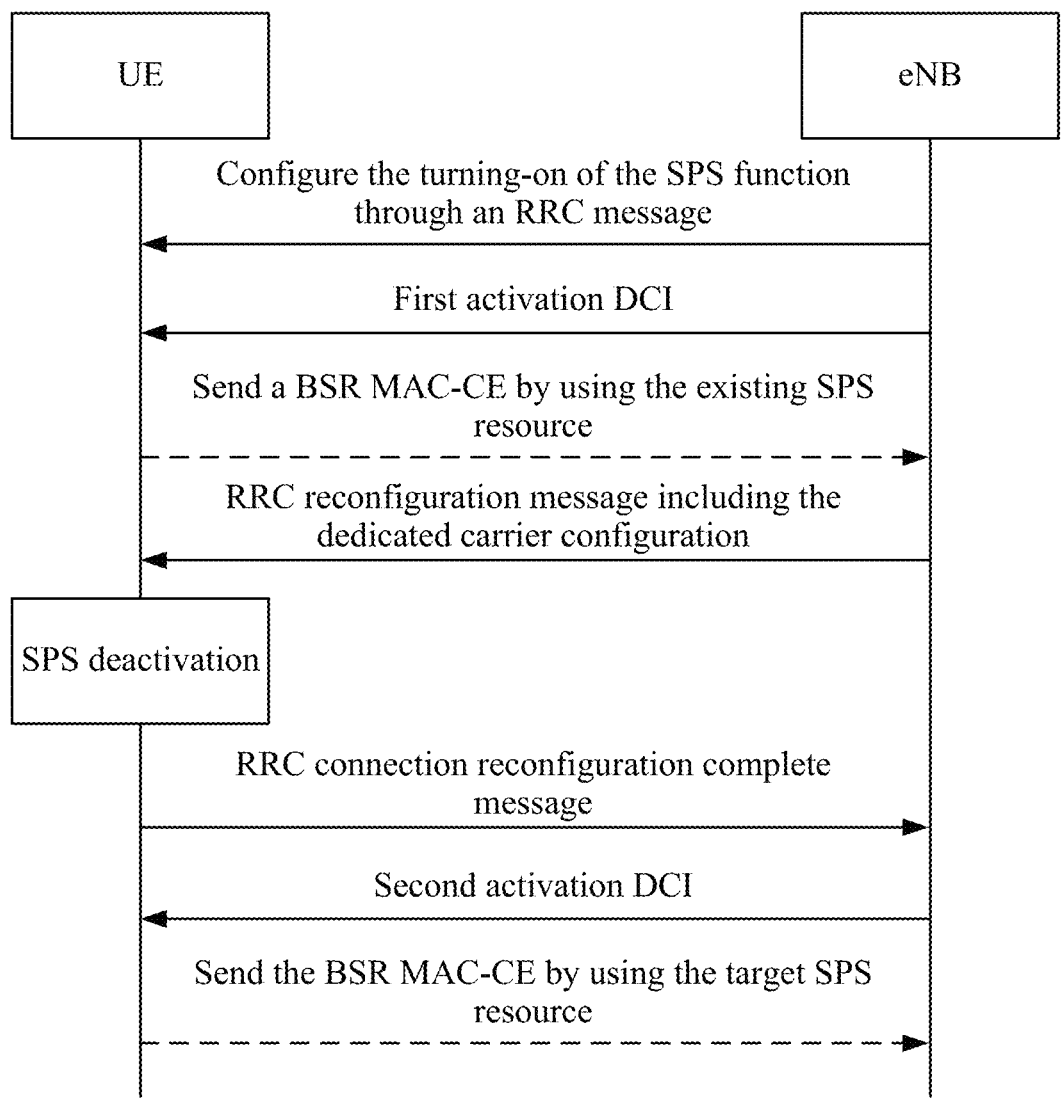
FIG. 2 is a diagram of determining a target SPS resource according to an embodiment.

FIG. 2 is a diagram of determining the target SPS resource according to an embodiment. In the embodiment, the RRC reconfiguration message does not include the relevant configuration of the target SPS resource, the target SPS resource is determined according to the first SPS C-RNTI, the first SPS period and the first activation DCI, and the terminal needs to wait for the second activation DCI.

As shown in FIG. 2, the terminal accesses the NB-IoT network in a User Plane (UP) mode, and the network side is, for example, an Evolved NodeB (eNB). The eNB has configured the turning-on of the SPS function through an RRC message, and issues the first SPS C-RNTI and the first SPS period. The eNB has activated the existing SPS resource through the first activation DCI, and the terminal sends a BSR MAC CE using the existing SPS resource.

The eNB sends the RRC reconfiguration message. The RRC reconfiguration message includes the dedicated carrier configuration information for instructing the terminal to switch to a new uplink carrier.

The terminal receives the RRC reconfiguration message, the RRC layer instructs the bottom layer deactivates the SPS function, and the bottom layer stops using the existing SPS resource to send the BSR MAC CE.

The terminal re-establishes an RRC connection with the eNB on the carrier indicated by the dedicated carrier configuration information, and sends the RRC connection reconfiguration complete message to the eNB; after receiving the RRC connection reconfiguration complete message, the eNB takes that the existing SPS resource of the terminal has been deactivated as default, stops receiving the BSR MAC CE on the existing SPS resource, deletes the existing SPS resource allocated to the terminal, and sends the second activation DCI to the terminal to activate the target SPS resource.

In a case of receiving the second activation DCI, the terminal determines the target SPS resource on the carrier indicated by the dedicated carrier configuration information according to the saved first SPS C-RNTI, the first SPS period and the indication of the first activation DCI, and sends the BSR MAC CE by using the target SPS resource; the eNB determines the target SPS resource on the new carrier in the same manner and receives the BSR MAC CE on the target SPS resource.

Figure 3:
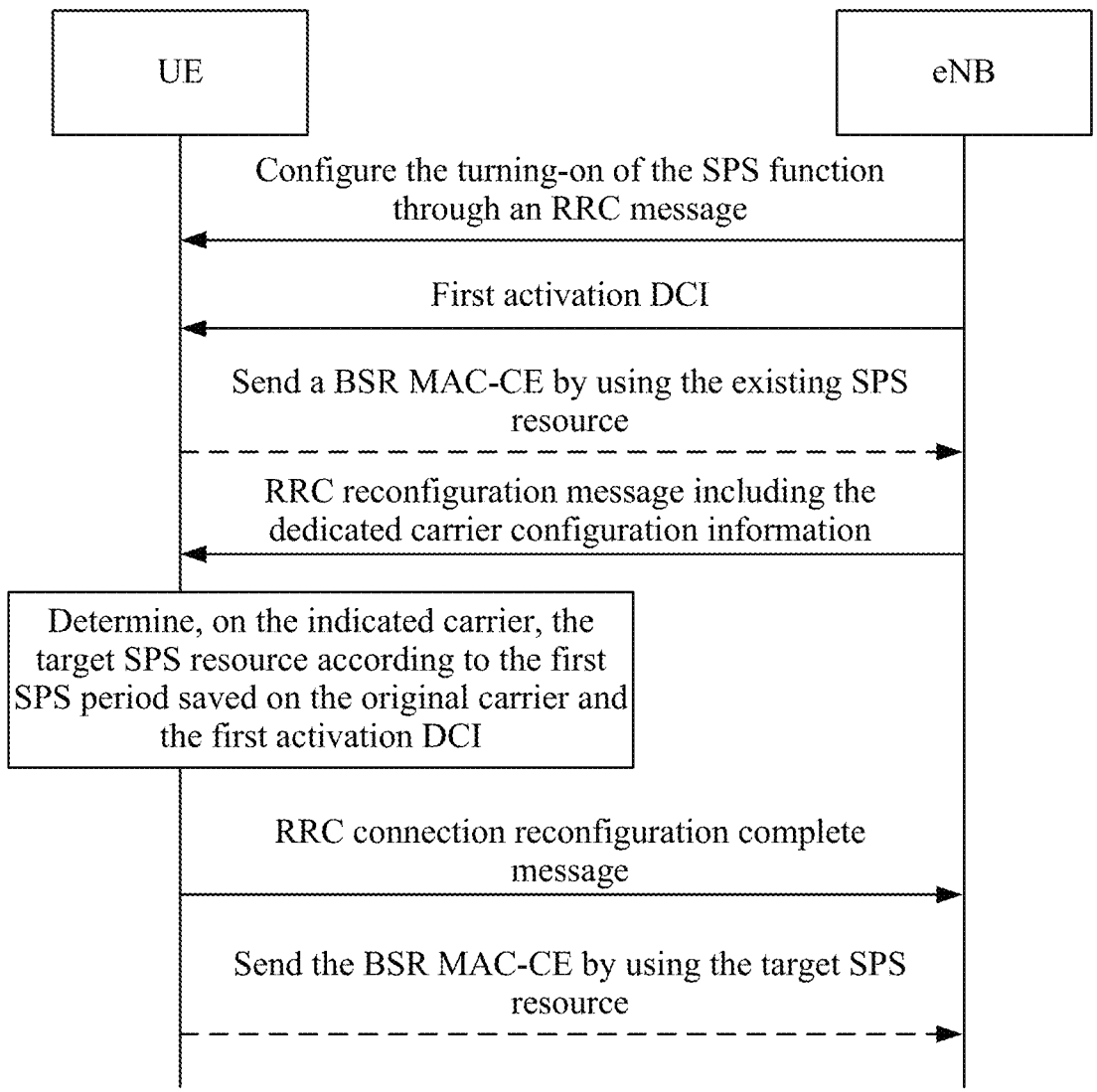
FIG. 3 is a diagram of determining a target SPS resource according to another embodiment.

FIG. 3 is a diagram of determining the target SPS resource according to another embodiment. In the embodiment, the RRC reconfiguration message does not include the relevant configuration of the target SPS resource, the target SPS resource is determined according to the first SPS C-RNTI, the first SPS period and the first activation DCI, and the terminal does not need to wait for the second activation DCI.

The terminal accesses the NB-IoT network in an UP mode, and a communication node on the network side is, for example, an eNB. The eNB has configured the turning-on of the SPS function through an RRC message, and issues the first SPS C-RNTI and the first SPS period. The eNB has activated the existing SPS resource through the first activation DCI, and the terminal sends a BSR MAC CE using the existing SPS resource.

The eNB sends the RRC reconfiguration message. The RRC reconfiguration message includes the dedicated carrier configuration information for instructing the terminal to switch to a new uplink carrier.

The terminal receives the RRC reconfiguration message, the RRC layer instructs the bottom layer to deactivate the SPS function, and the bottom layer stops using the existing SPS resource to send the BSR MAC CE.

The terminal re-establishes an RRC connection with the eNB on the carrier indicated by the dedicated carrier configuration information, and sends the RRC connection reconfiguration complete message to the eNB; after receiving the RRC connection reconfiguration complete message, the eNB takes that the existing SPS resource of the terminal has been deactivated as default, stops receiving the BSR MAC CE on the existing SPS resource, and deletes the existing SPS resource allocated to the terminal.

The terminal determines, on the carrier indicated by dedicated carrier configuration information and on the subcarrier indicated by the first activation DCI, the time domain starting position of the target SPS resource according to the saved first SPS period, the subframe number $\text{subframe}_{start\ time}$ and the radio frame number $SFN_{start\ time}$ of the starting position of the NPUSCH allocated by the first activation DCI, and the radio frame number SFN and the subframe number subframe of the time domain starting position of the target SPS resource satisfy that:

$$(10*SFN+\text{subframe}) = [(10*SFN_{start\ time} + \text{subframe}_{start\ time}) + N*semiPersistSchedIntervalUL]\ modulo\ 10240,$$

where SFN and subframe represent the radio frame number and the subframe number of the starting position of the SPS NPUSCH; $SFN_{start\ time}$ and $\text{subframe}_{start\ time}$ represent the radio frame number and the subframe number of the starting position of the NPUSCH allocated in the first activation DCI; and semiPersistSchedIntervalUL represents the first SPS period.

After the RRC connection reconfiguration is completed (or after a certain time interval of the ending subframe of the NPUSCH carrying the RRC connection reconfiguration complete message), the terminal sends the BSR MAC CE by using the target SPS resource, and the eNB determines the target SPS resource on the new carrier in the same manner and receives the BSR MAC CE on the target SPS resource.

Figure 4:
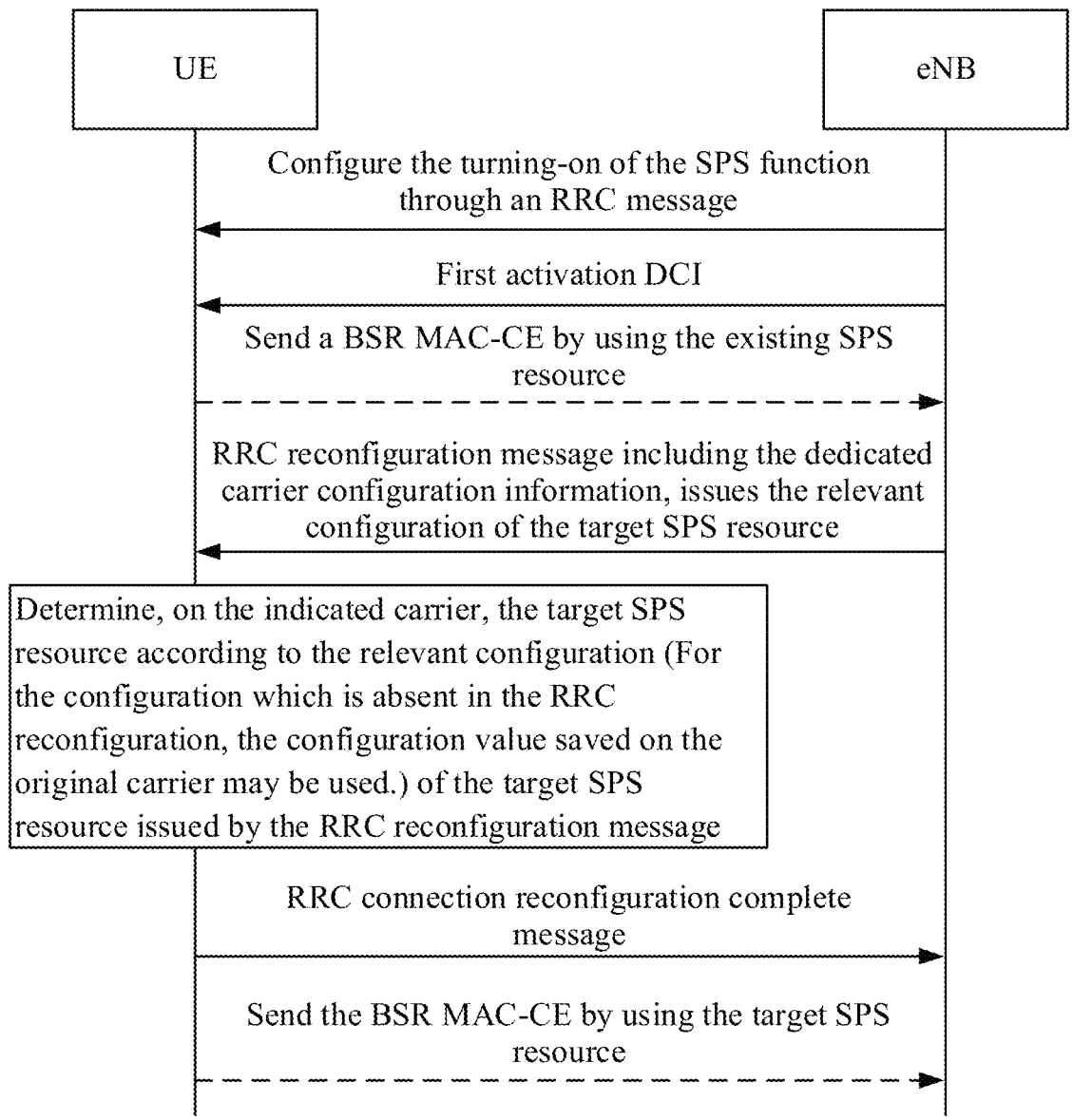
FIG. 4 is diagram of determining a target SPS resource according to another embodiment.

FIG. 4 is a diagram of determining the target SPS resource according to another embodiment. In the embodiment, the RRC reconfiguration message includes the relevant configuration of the target SPS resource, and the target SPS resource is determined according to the relevant configuration (for the relevant configuration not indicated in the RRC reconfiguration message, reference may be made to the relevant configuration on the original carrier) of the target SPS resource in the RRC reconfiguration message, and the terminal does not need to wait for the second activation DCI.

The terminal accesses the NB-IoT network in an UP mode, and a communication node on the network side is, for example, an eNB. The eNB has configured the turning-on of the SPS function through an RRC message, and issues the first SPS C-RNTI and the first SPS period. The eNB has activated the existing SPS resource through the first activation DCI, and the terminal sends a BSR MAC CE using the existing SPS resource.

The eNB sends the RRC reconfiguration message. The RRC reconfiguration message includes the dedicated carrier configuration information for instructing the terminal to switch to a new uplink carrier. The RRC reconfiguration message further includes: the subcarrier where the NPUSCH of the target SPS resource is located; the number of repetitions of the NPUSCH of the target SPS resource; the radio frame number $SFN_{start\ time}$ and the subframe number $subframe_{start\ time}$ of the time domain starting position of the NPUSCH of the target SPS resource; or the set time interval T between the time domain starting position of the NPUSCH of the target SPS resource and the ending subframe of the NPDSCH carrying the RRC connection reconfiguration complete message.

The terminal receives the RRC reconfiguration message, the RRC layer instructs the bottom layer to deactivate the SPS function, and the bottom layer stops using the existing SPS resource to send the BSR MAC CE.

The terminal re-establishes an RRC connection with the eNB on the carrier indicated by the dedicated carrier configuration information, and sends the RRC connection reconfiguration complete message to the eNB; after receiving the RRC connection reconfiguration complete message, the eNB takes that the existing SPS resource of the terminal has been deactivated as default, stops receiving the BSR MAC CE on the existing SPS resource, and deletes the existing SPS resource allocated to the terminal.

The terminal calculates, on the carrier indicated by the dedicated carrier configuration information and the subcarrier indicated by the RRC reconfiguration message, the time domain starting position of the target SPS resource according to the first SPS period (since no second SPS period corresponding to the target SPS resource is indicated in the RRC reconfiguration message) and the subframe number $subframe_{start\ time}$ and the radio frame number $SFN_{start\ time}$ of the starting position of the NPUSCH of the target SPS resource indicated by the RRC reconfiguration message. The radio frame number SFN and the subframe number subframe of the time domain starting position of the target SPS resource satisfy the following formula:

$$(10*SFN+\text{subframe})=[(10*SFN_{start\ time}+\text{subframe}_{start\ time})+N*semiPersistSchedIntervalUL]\ modulo\ 10240,$$

where SFN and subframe represent the radio frame number and the subframe number of the starting position of the NPUSCH of the target SPS resource, respectively; $SFN_{start\ time}$ and $subframe_{start\ time}$ represent the radio frame number and the subframe number of the starting position of the NPUSCH indicated by the RRC reconfiguration message, respectively; and semiPersistSchedIntervalUL represents the first SPS period.

Alternatively, the terminal calculates, on the carrier indicated by the dedicated carrier configuration information and the subcarrier indicated by the RRC reconfiguration message, the time domain starting position of the target SPS resource according to the first SPS period (since no second SPS period corresponding to the target SPS resource is indicated in the RRC reconfiguration message) and T indicated by the RRC reconfiguration message. The radio frame number SFN and the subframe number subframe of the time domain starting position of the target SPS resource satisfy the following formula:

$$(10*SFN+\text{subframe})=[(10*SFN_{start\ time}+\text{subframe}_{start\ time})+N*semiPersistSchedIntervalUL]\ modulo\ 10240,$$

where SFN and subframe represent the radio frame number and the subframe number of the starting position of the NPUSCH of the target SPS resource; $SFN_{end\ time}$ and $subframe_{end\ time}$ represent the radio frame number and the subframe number of the ending subframe of the NPDSCH carrying the RRC connection reconfiguration complete message indicated by the RRC reconfiguration message, respectively; and semiPersistSchedIntervalUL represents the first SPS period.

After the RRC connection reconfiguration is completed (or after a certain time interval of the ending subframe of the NPUSCH carrying the RRC connection reconfiguration complete message), the terminal sends the BSR MAC CE by using the target SPS resource; and the eNB determines the target SPS resource on the new carrier in the same manner and receives the BSR MAC CE on the target SPS resource.

The relevant configuration of the target SPS resource in the RRC reconfiguration message may include the subcarrier, the number of repetitions, the second SPS period, or one or more items (the radio frame number and the subframe number of the time domain starting position or the set time interval T) related to the time domain starting position; and the relevant configuration not indicated in the RRC reconfiguration message may be determined by referring to the relevant configuration on the original carrier, that is, the target SPS resource may be determined according to at least one of the relevant configuration indicated by the RRC reconfiguration message or the saved relevant configuration on the original carrier, so that a complete solution is provided for the deactivation or continued use of the existing SPS resource. In this manner, the flexibility of the SPS function is improved, the effective and reliable transmission of the BSR is ensured, and the signaling overhead is saved.

Figure 5:
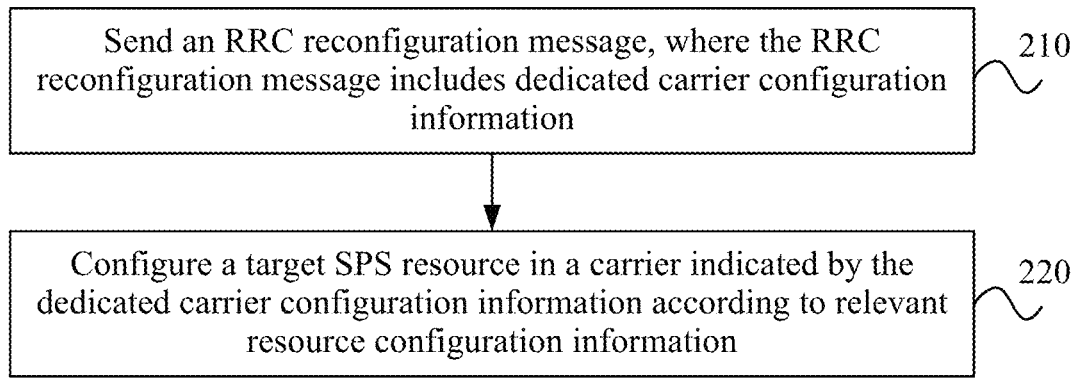
FIG. 5 is a flowchart of a resource configuration method according to an embodiment.

FIG. 5 is a flowchart of a resource configuration method according to an embodiment. The resource configuration method of the embodiment is applicable to a communication node, for example, a communication node, such as an eNB, on the network side. For the technical solution not described in detail in the embodiment, reference may be made to any one of the preceding embodiments. As shown in FIG. 5, the method provided in the embodiment includes 210 and 220.

In 210, an RRC reconfiguration message is sent, where the RRC reconfiguration message includes dedicated carrier configuration information.

In 220, a target SPS resource in a carrier indicated by the dedicated carrier configuration information is configured according to relevant resource configuration information.

In the embodiment, the RRC reconfiguration message includes the dedicated carrier configuration information used for instructing the terminal to switch from an original carrier to the indicated carrier. Before 210, the terminal operates on the original carrier (the original carrier is different from the carrier indicated by the dedicated carrier configuration information) and knows the SPS resource used in the original carrier (described as an existing SPS resource in embodiments described below).

The resource configuration method of the embodiment provides a solution for re-determining the target SPS resource in a case where the network side reconfigures the dedicated carrier of the terminal through the RRC reconfiguration message, so as to achieve the SPS function in the carrier switching scene, and improve the flexibility and reliability of SPS resource transmission in the carrier switching scene.

In an embodiment, the RRC reconfiguration message may further include relevant configuration of the target SPS resource.

In an embodiment, the eNB may turn on the SPS function and activate the target SPS resource by resending activation DCI, or may turn on the SPS function and activate the target SPS resource through the RRC reconfiguration message without resending the activation DCI.

In an embodiment, 200 is further included.

In 200, the existing SPS resource is configured according to first activation DCI, a first SPS C-RNTI and a first SPS period.

In the embodiment, before sending the RRC reconfiguration message, the terminal has received relevant configuration, including the first SPS C-RNTI and the first SPS period, of the SPS function through an RRC message; then the terminal and the eNB may determine the existing SPS resource in the original carrier used for transmitting a BSR according to the first SPS C-RNTI and the first SPS period and under the indication of the first activation DCI.

In an embodiment, the relevant resource configuration information includes a first SPS C-RNTI and a first SPS period, and 220 includes the following. The target SPS resource is configured according to the relevant resource configuration information, and the target SPS resource is activated by sending second activation DCI.

In the embodiment, the eNB turns on the SPS function and activates the target SPS resource by resending the activation DCI (that is, the second activation DCI).

In an embodiment, the RRC reconfiguration message is used for indicating that the terminal releases an existing SPS resource.

In the embodiment, in a case of receiving the RRC reconfiguration message, the terminal releases the existing SPS resource to complete the deactivation of the SPS function.

In an embodiment, the relevant resource configuration information includes first activation DCI, a first SPS C-RNTI and a first SPS period, and 220 includes the following.

The target SPS resource is configured according to the relevant resource configuration information, and the target SPS resource is activated through the RRC reconfiguration message.

In the embodiment, the eNB does not need to resend the activation DCI, and in a case where the terminal receives the RRC reconfiguration message, the terminal stops using the existing SPS resource in the original carrier, and on the basis that the first activation DCI has activated the SPS function, determines the target SPS resource in the carrier indicated by the dedicated carrier configuration information according to the first SPS C-RNTI and the first SPS period.

In an embodiment, the RRC reconfiguration message further includes at least one of: subcarrier information, a time domain starting position, a second SPS C-RNTI, the number of repetitions or a second SPS period, and the relevant resource configuration information includes the RRC reconfiguration message. 220 includes the following.

The target SPS resource is configured according to the relevant resource configuration information, and the target SPS resource is activated through the RRC reconfiguration message.

In the embodiment, a cell is newly added to the RRC reconfiguration message for indicating information of the SPS physical resource after the RRC reconfiguration, and the terminal does not need to re-receive the activation DCI.

In an embodiment, 230 is further included.

In 230, after a set time interval of an ending subframe of an NPUSCH of the terminal side on which an RRC connection reconfiguration complete message is sent, a BSR is received through the target SPS resource.

In the embodiment, in a case where it is not required to resend the activation DCI, the taking-effect time of the relevant configuration of the target SPS resource is after the terminal sending the RRC connection reconfiguration complete message, for example, may be after the set time interval of the ending subframe of the NPUSCH carrying the RRC connection reconfiguration complete message. Only after the relevant configuration of the target SPS resource takes effect, the complete target SPS resource is the SPS resource available for transmitting the BSR, and between the time when the terminal receives the RRC reconfiguration message and the taking-effect time, the eNB does not use the existing SPS resource or the target SPS resource to receive a BSR MAC CE.

Figure 6:
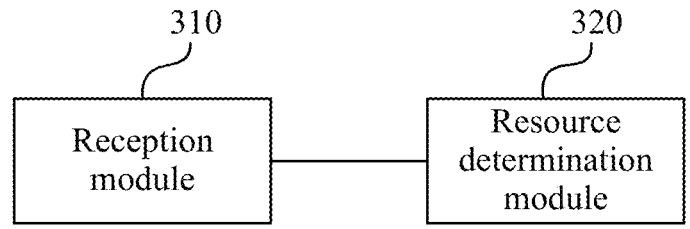
FIG. 6 is a structural diagram of a resource determination apparatus according to an embodiment.

An embodiment of the present application further provides a resource determination apparatus. FIG. 6 is a structural diagram of a resource determination apparatus according to an embodiment. As shown in FIG. 6, the resource determination apparatus includes a reception module 310 and a resource determination module 320.

The reception module 310 is configured to receive an RRC reconfiguration message, where the RRC reconfiguration message includes dedicated carrier configuration information; and the resource determination module 320 is configured to determine a target SPS resource in a carrier indicated by the dedicated carrier configuration information according to relevant resource configuration information.

According to the resource determination apparatus of the embodiment, in a case where the terminal is reconfigured to the indicated dedicated carrier through the RRC reconfiguration message, the target SPS resource used in the indicated carrier can be re-determined according to the relevant resource configuration information, so that the flexibility and reliability of SPS resource transmission in the carrier switching scene can be improved.

In an embodiment, an existing resource determination module is further included.

The existing resource determination module is configured to determine an existing SPS resource according to first activation DCI, a first SPS C-RNTI and a first SPS period.

In an embodiment, the relevant resource configuration information includes a first SPS C-RNTI and a first SPS period.

The resource determination module 320 is configured to, in a case where second activation DCI is received, determine the target SPS resource according to the relevant resource configuration information.

In an embodiment, a releasing module is further included.

The releasing module is configured to release an existing SPS resource according to the RRC reconfiguration message.

In an embodiment, the relevant resource configuration information includes first activation DCI, a first SPS C-RNTI and a first SPS period.

The resource determination module is configured to, in a case where the RRC reconfiguration message is received, determine the target SPS resource according to the relevant resource configuration information.

In an embodiment, the RRC reconfiguration message further includes at least one of: subcarrier information, a time domain starting position, a second SPS C-RNTI, the number of repetitions or a second SPS period, and the relevant resource configuration information includes the RRC reconfiguration message.

The resource determination module is configured to, in a case where the RRC reconfiguration message is received, determine the target SPS resource according to the relevant resource configuration information.

In an embodiment, a data volume sending module is further included.

The data volume sending module is configured to, after a set time interval of an ending subframe of an NPUSCH on which an RRC connection reconfiguration complete message is sent, send the volume BSR of to-be-transmitted uplink data through the target SPS resource.

The resource determination apparatus provided in the embodiment and the resource determination method provided in the preceding embodiment belong to the same inventive concept. For technical details not described in detail in the embodiment, reference may be made to any one of the preceding embodiments, and the embodiment has the same effects as executing the resource determination method.

Figure 7:
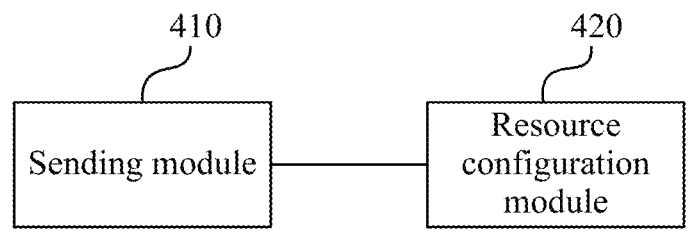
FIG. 7 is a structural diagram of a resource configuration apparatus according to an embodiment.

An embodiment of the present application further provides a resource configuration apparatus. FIG. 7 is a structural diagram of a resource configuration apparatus according to an embodiment. As shown in FIG. 7, the resource configuration apparatus includes a sending module 410 and a resource configuration module 420.

The sending module 410 is configured to send an RRC reconfiguration message, where the RRC reconfiguration message includes dedicated carrier configuration information; and the resource configuration module 420 is configured to configure a target SPS resource in a carrier indicated by the dedicated carrier configuration information according to relevant resource configuration information.

The resource configuration apparatus of the embodiment provides a solution for re-determining the target SPS resource in a case where the network side reconfigures the dedicated carrier of the terminal through the RRC reconfiguration message, so as to achieve the SPS function in the carrier switching scene, and improve the flexibility and reliability of SPS resource transmission in the carrier switching scene.

In an embodiment, an existing resource configuration module is further included.

The existing resource configuration module is configured to configure an existing SPS resource according to first activation DCI, a first SPS C-RNTI and a first SPS period.

In an embodiment, the relevant resource configuration information includes a first SPS C-RNTI and a first SPS period.

The resource configuration module 420 is configured to configure the target SPS resource according to the relevant resource configuration information, and activate the target SPS resource by sending second activation DCI.

In an embodiment, the RRC reconfiguration message is used for indicating that the terminal releases an existing SPS resource.

In an embodiment, the relevant resource configuration information includes first activation DCI, a first SPS C-RNTI and a first SPS period.

The resource configuration module 420 is configured to configure the target SPS resource according to the relevant resource configuration information, and activate the target SPS resource through the RRC reconfiguration message.

In an embodiment, the RRC reconfiguration message further includes at least one of: subcarrier information, a time domain starting position, a second SPS C-RNTI, the number of repetitions or a second SPS period, and the relevant resource configuration information includes the RRC reconfiguration message.

The resource configuration module 420 is configured to configure the target SPS resource according to the relevant resource configuration information, and activate the target SPS resource through the RRC reconfiguration message.

In an embodiment, a data volume reception module is further included.

The data volume reception module is configured to, after a set time interval of an ending subframe of an NPUSCH of the terminal side, on which an RRC connection reconfiguration complete message is sent, receive a BSR through the target SPS resource.

The resource configuration apparatus provided in the embodiment and the resource configuration method provided in the preceding embodiment belong to the same inventive concept. For technical details not described in detail in the embodiment, reference may be made to any one of the preceding embodiments, and the embodiment has the same effects as executing the resource configuration method.

Figure 8:
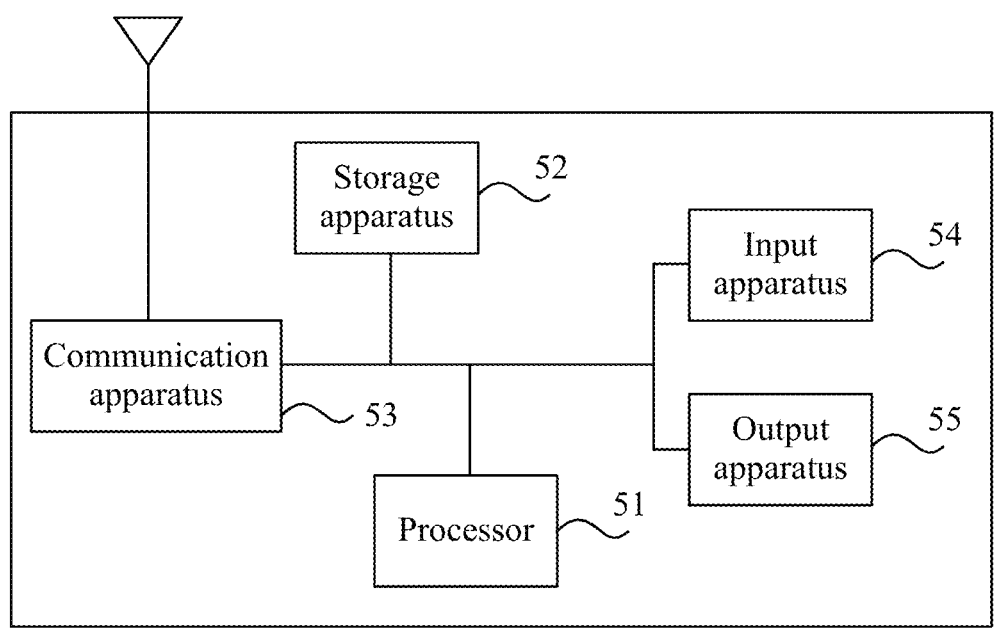
FIG. 8 is a structural diagram of hardware of a communication node according to an embodiment.

An embodiment of the present application further provides a communication node. FIG. 8 is a structural diagram of hardware of a communication node according to an embodiment. As shown in FIG. 8, the communication node provided in the present application includes one or more processors 51 which, when executing, implement the resource determination method or resource configuration method provided in any embodiment of the present application. Correspondingly, the communication node is a terminal or a network side node.

The communication node may further include a storage apparatus 52. One or more processors 51 may be provided in the communication node, and one processor 51 is used as an example in FIG. 8. The storage apparatus 52 is configured to store one or more programs which, when executed by the one or more processors 51, cause the one or more processors 51 to implement the resource determination method or the resource configuration method in embodiments of the present application.

The communication node further includes a communication apparatus 53, an input apparatus 54 and an output apparatus 55.

The one or more processors 51, the storage apparatus 52, the communication apparatus 53, the input apparatus 54 and the output apparatus 55 in the communication node may be connected via a bus or other means, with connection via the bus as an example in FIG. 8.

The input apparatus 54 may be configured to receive input digital or character information and generate key signal input related to user settings and function control of the communication node. The output apparatus 55 may include a display device, for example, a display screen.

The communication apparatus 53 may include a receiver and a sender. The communication apparatus 53 is configured to perform information transceiving and communication under the control of the one or more processors 51.

As a computer-readable storage medium, the storage apparatus 52 may be configured to store software programs, computer-executable programs and modules, such as program instructions/modules (for example, the sending module 310 and the resource determination module 320) corresponding to the resource determination method according to the embodiments of the present application. The storage apparatus 52 may include a program storage region and a data storage region, where the program storage region may store an operating system and an application program required by at least one function while the data storage region may store data created depending on use of the communication node. Additionally, the storage apparatus 52 may include a high-speed random-access memory and may further include a nonvolatile memory, such as at least one disk memory device, a flash memory device, or another nonvolatile solid-state memory. In some examples, the storage apparatus 52 may include memories which are remotely disposed with respect to the one or more processors 51. These remote memories may be connected to the communication node via a network. Examples of the preceding network include, but are not limited to, the Internet, an intranet, a local area network, a mobile communication network and a combination thereof.

An embodiment of the present application further provides a storage medium. The storage medium stores a computer program which, when executed by a processor, implements the resource determination method or the resource configuration method according to any embodiment of the present application.

The resource determination method includes steps described below.

An RRC reconfiguration message is received, where the RRC reconfiguration message includes dedicated carrier configuration information; and a target SPS resource in a carrier indicated by the dedicated carrier configuration information is determined according to relevant resource configuration information.

The resource configuration method includes steps described below.

An RRC reconfiguration message is sent, where the RRC reconfiguration message includes dedicated carrier configuration information; and a target SPS resource in a carrier indicated by the dedicated carrier configuration information is configured according to relevant resource configuration information.

A computer storage medium in the embodiment of the present application may adopt any combination of one or more computer-readable media. The computer-readable media may be computer-readable signal media or computer-readable storage media. The computer-readable storage medium may be, for example, but is not limited to, an electrical, magnetic, optical, electromagnetic, infrared, or semiconductor system, apparatus, or device, or any combination thereof. Examples (a non-exhaustive list) of the computer-readable storage medium include: an electrical connection having one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any suitable combination thereof. The computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate or transmit a program used by or used in conjunction with an instruction execution system, apparatus or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may further include conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In a case related to the remote computer, the remote computer may be connected to the user computer via any type of network including a local area network (LAN) or a wide area network (WAN) or may be connected to an external computer (for example, via the Internet through an Internet service provider).

The term terminal encompasses any appropriate type of radio user device, such as a mobile phone, a portable data processing apparatus, a portable web browser or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another computing device, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology such as, but not limited to, a read-only memory (ROM), a random-access memory (RAM) or an optical memory device and system (a digital video disc (DVD) or a compact disc (CD)).

Computer-readable media may include non-transitory storage media. The data processor may be of any type suitable for a local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A resource determination method, comprising:
   receiving a radio resource control (RRC) reconfiguration message, wherein the RRC reconfiguration message comprises dedicated carrier configuration information that includes a carrier, wherein the RRC reconfiguration message indicates to switch to the carrier, and wherein the RRC reconfiguration message does not include configuration of a target semi-persistent scheduling (SPS) resource; and
   releasing an existing SPS resource according to the RRC reconfiguration message,
      wherein the existing SPS resource is determined according to first activation downlink control information (DCI), a first SPS cell radio network temporary identifier (C-RNTI), and a first SPS period, and
      wherein in a case where a second activation DCI is received, determining the target SPS resource in a carrier indicated by the dedicated carrier configuration information, wherein the target SPS resource is determined according to resource configuration information.

2. The method of claim 1, wherein the resource configuration information comprises the first SPS C-RNTI and the first SPS period.

3. A communication node, comprising:
   at least one processor; and
   a storage apparatus configured to store at least one program;
   wherein the at least program, when executed by the at least one processor, causes the at least one processor to implement the following steps:
      receive a radio resource control (RRC) reconfiguration message, wherein the RRC reconfiguration message comprises dedicated carrier configuration information that includes a carrier, wherein the RRC reconfiguration message indicates to switch to the carrier, and wherein the RRC reconfiguration message does not include configuration of a target semi-persistent scheduling (SPS) resource; and
      release an existing SPS resource according to the RRC reconfiguration message,
         wherein the existing SPS resource is determined according to first activation downlink control information (DCI), a first SPS cell radio network temporary identifier (C-RNTI), and a first SPS period, and
         wherein in a case where a second activation DCI is received, determine the target SPS resource in a carrier indicated by the dedicated carrier configuration information, wherein the target SPS resource is determined according to resource configuration information.

4. The communication node of claim 3, wherein the resource configuration information comprises the first SPS C-RNTI and the first SPS period.

5. A non-transitory computer-readable storage medium comprising a computer program which, when executed by a processor, causes the processor to perform a method, comprising:
   receiving a radio resource control (RRC) reconfiguration message, wherein the RRC reconfiguration message comprises dedicated carrier configuration information that includes a carrier, wherein the RRC reconfiguration message indicates to switch to the carrier, and wherein the RRC reconfiguration message does not include configuration of a target semi-persistent scheduling (SPS) resource; and
   releasing an existing SPS resource according to the RRC reconfiguration message,
      wherein the existing SPS resource is determined according to first activation downlink control information (DCI), a first SPS cell radio network temporary identifier (C-RNTI), and a first SPS period, and
      wherein in a case where a second activation DCI is received, determining the target SPS resource in a carrier indicated by the dedicated carrier configuration information, wherein the target SPS resource is determined according to resource configuration information.

6. The non-transitory computer-readable storage medium of claim 5, wherein the resource configuration information comprises the first SPS C-RNTI and the first SPS period.

* * * * *